Patented May 23, 1950

2,508,599

UNITED STATES PATENT OFFICE 2,508,599

FEED FOR LIVESTOCK

Wallace P. Elmslie, Quincy, Ill., assignor to Moorman Manufacturing Company, Quincy, Ill., a corporation of Illinois No Drawing. Application November 29, 1946, Serial No. 713,103

5 Claims. (Cl. 99—2)

This invention relates to improvements in types of mineral feeds for live stock. More particularly, it pertains to feeds for ruminants, hogs, horses and mules, poultry, and the like, in block form or in the form of a mass of discrete particles, such as, for example, powdered feeds, having incorporated therein urea and salt, the urea in the presence of the salt having the property of imparting to the feed such characteristics as hydroscopicity and palatability, and the provision of such feed is a principal object of the invention.

Other objects of the invention will in part be obvious and will in part appear hereinafter.

The invention accordingly comprises a composition of matter possessing the characteristics, properties and the relation of components which will be exemplified in the composition hereinafter described and the scope of the application of which will be indicated in the claims.

I have found that urea, when added to certain mineral feeds in relatively small percentages, considerably increases the palatability of such feeds for live stock. This appears to be particularly true when urea is added to conventional block mineral feeds and set out for cattle, sheep, hogs, horses and mules. Apparently the enhanced palatability is not due so much to the taste of urea itself as to the fact that the urea imparts hydroscopic properties to the block in the presence of a salt, such as, for example, sodium chloride which substantially all of such blocks contain, rendering them much softer when put out for feeding purposes than the block would be without the urea.

In accordance with the principles of the present invention it is possible to manufacture such blocks with urea in sufficiently hard condition to withstand transportation but, on exposure of the block to a normally moist atmosphere, the urea will take on sufficient moisture to maintain the block in a relatively soft and easily consumable condition without causing disintegration thereof.

The mode of action of urea in the presence of salt is synergistic in nature, the two materials combining to impart properties to mineral feeds not imparted by either alone. Both hydroscopicity and palatability are increased beyond what would be expected of either chemical, urea or salt, acting separately.

The invention is not limited in its scope to the application of block type minerals useful for such purposes, but contemplates a similar use in connection with masses of discrete particles, such as mineral feeds in powdered or granular form which are particularly adapted for use in connection with poultry, swine, and the like.

Many different formulas could be described for grazing or range cattle, sheep, hogs, horses and mules, poultry, and the like, setting forth the mineral contents and other ingredients constituting such feeds. However, such materials for use in feeds are well known and it is only necessary to state, for the purpose of the present disclosure, that a salt, such as sodium chloride, is an essential ingredient when using urea in practicing the present invention.

Urea (carbamide) in any suitable form may be utilized, whether it be used in its crystalline form, or otherwise incorporated with small amounts of non-hydroscopic material. The amount of urea should not be less than 0.5 per cent nor more than 10 per cent, based on the total dry weight of the feed content, when the block form of feed is used. An optimum amount of urea would be about 2 per cent based on the total dry weight of the material constituting the block.

With respect to the powdered or granular forms the amount of urea should not be less than 0.5 per cent nor more than 15 per cent based on the total dry weight of the feed content. An optimum amount of urea present when a powdered or granular type of feed is used would be about 5 per cent of the total dry weight of the feed content.

In the presence of the salt the urea has the property of imparting to the feed the characteristics of hydroscopicity and palatability. Other advantages reside in the decreased waste of feed materials, particularly in connection with the powder, because such material will not readily blow away when combined with suitable amounts of urea due to the action of the latter. Another advantage is that better physical characteristics are imparted to the block as well as to the powder. Urea is also a good source of protein for ruminants, due to the fact that this simple form of nitrogen is transformed by bacteria and other organisms in the paunch of cattle and sheep into protein which is of good quality and readily assimilable by these animals.

Since certain changes may be made in the above composition of matter and different embodiments of the invention could be made without departing from its scope, it is intended that all matter contained in the above description shall be interpreted as illustrative and not in a limiting sense.

It is also to be understood that the following claims are intended to cover all of the generic Having described my invention what I claim as new and desire to secure by Letters Patent is:

1. A composition of matter, which comprises a block of mineral feed for live stock and which contains, as essential ingredients, sodium chloride and approximately 0.5 per cent to 10 per cent of urea based on the total dry weight of the materials constituting the block, the urea in the presence of the sodium chloride having the property of imparting to the block the characteristics of hydroscopicity and palatability.

2. A composition of matter, which comprises a block of mineral feed for live stock and which contains, as essential ingredients, sodium chloride and approximately 2 per cent of urea based on the total dry weight of the materials constituting the block, the urea in the presence of the sodium chloride having the property of imparting to the block the characteristics of hydroscopicity and palatability.

3. A composition of matter, which comprises a mass of discrete particles of mineral feed for live stock and containing, as essential ingredients, sodium chloride and approximately 0.5 per cent to 15 per cent of urea based on the total dry weight of the materials constituting the mass, the urea in the presence of the sodium chloride having the property of imparting to the mass the characteristics of hydroscopicity and palatability.

4. A composition of matter, which comprises a mass of discrete particles of mineral feed for live stock and containing, as essential ingredients, sodium chloride and approximately 5 per cent of urea based on the total dry weight of the materials constituting the mass, the urea in the presence of the sodium chloride having the property of imparting to the mass the characteristics of hydroscopicity and palatability.

5. A mineral feed for live stock comprising in addition to and in intimate admixture with the mineral ingredients a substantial quantity of sodium chloride and sufficient urea to impart hydroscopicity and palatability to said feed.

WALLACE P. ELMSLIE.

REFERENCES CITED

The following references are of record in the file of this patent:

UNITED STATES PATENTS

| Number | Name | Date |
|---|---|---|
| 2,142,825 | Patten | Jan. 3, 1939 |

OTHER REFERENCES

Chem. Ab., vol. 37, page 6715[8], 1943.
Chem. Ab., vol. 38, pages 6418[5] and 1809[9], 1944.